(12) United States Patent
Kim et al.

(10) Patent No.: US 11,119,515 B2
(45) Date of Patent: Sep. 14, 2021

(54) LOW PROFILE PRESSURE REGULATOR

(71) Applicants: GM GLOBAL TECHNOLOGY OPERATIONS LLC, Detroit, MI (US); THE REGENTS OF THE UNIVERSITY OF MICHIGAN, Ann Arbor, MI (US)

(72) Inventors: Wonhee M. Kim, Royal Oak, MI (US); Paul W. Alexander, Ypsilanti, MI (US); Jonathan E. Luntz, Ann Arbor, MI (US); Diann Brei, Milford, MI (US); Laura Alejandra Giner Munoz, Ann Arbor, MI (US); Shiyu Zhao, Dalian (CN); Koray Benli, Ann Arbor, MI (US)

(73) Assignees: GM GLOBAL TECHNOLOGY OPERATIONS LLC, Detroit, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 43 days.

(21) Appl. No.: 16/676,985

(22) Filed: Nov. 7, 2019

(65) Prior Publication Data
US 2021/0141402 A1 May 13, 2021

(51) Int. Cl.
*G05D 7/01* (2006.01)
*G05D 16/06* (2006.01)

(52) U.S. Cl.
CPC ......... *G05D 16/0619* (2013.01); *G05D 7/012* (2013.01); *G05D 16/0644* (2013.01); *Y10T 137/7792* (2015.04)

(58) Field of Classification Search
CPC .............. Y10T 137/7792; G05D 7/012; G05D 16/0644
USPC .......................................................... 138/45
See application file for complete search history.

(56) References Cited

U.S. PATENT DOCUMENTS

| | | | | |
|---|---|---|---|---|
| 1,095,767 A | * | 5/1914 | Adams ................... | G05D 7/012 138/46 |
| 2,424,654 A | * | 7/1947 | Gamble ................ | B01F 5/0403 48/189.4 |
| 2,434,835 A | * | 1/1948 | Colley ..................... | F16K 7/06 138/45 |
| 2,587,188 A | * | 2/1952 | McFadden ........... | B01J 13/0073 138/45 |
| 2,590,215 A | * | 3/1952 | Sausa ........................ | F16K 7/07 138/45 |

(Continued)

*Primary Examiner* — Robert K Arundale
(74) *Attorney, Agent, or Firm* — Harness, Dickey & Pierce, P.L.C.

(57) ABSTRACT

A pressure regulator includes an inlet channel, an outlet channel, a bladder, a first plate, and a second plate. The bladder is connected to the outlet channel and extends alongside of the inlet channel. The first plate is disposed on one side of the inlet channel between the bladder and the inlet channel. The second plate is disposed on the other side of the bladder and is at least partially aligned with the first plate along the length of the inlet channel such that a portion of the inlet channel is disposed between the first and second plates. When the bladder is pressurized, the bladder urges the first plate toward the second plate and thereby pinches the portion of the inlet channel disposed between the first and second plates to regulate a ratio of a pressure in the outlet channel to a pressure in the inlet channel.

19 Claims, 4 Drawing Sheets

(56) References Cited

U.S. PATENT DOCUMENTS

| | | | | |
|---|---|---|---|---|
| 2,590,396 A * | 3/1952 | Garretson | G05D 16/0613 | 137/484.8 |
| 3,276,480 A * | 10/1966 | Kennedy | F24F 11/75 | 138/45 |
| 3,342,215 A * | 9/1967 | Griffin, III | E21B 21/106 | 138/45 |
| 3,685,538 A * | 8/1972 | Sullivan | G05D 7/012 | 137/504 |
| 3,724,503 A * | 4/1973 | Cooke | F16K 7/061 | 138/45 |
| 3,970,105 A * | 7/1976 | Pelton | G05D 7/012 | 137/498 |
| 4,058,257 A * | 11/1977 | Spencer | A01G 25/023 | 239/107 |
| 4,092,999 A * | 6/1978 | Rubrich | G05D 7/0133 | 137/504 |
| 4,254,791 A * | 3/1981 | Bron | A01G 25/023 | 137/118.04 |
| 4,515,536 A * | 5/1985 | van Os | F04B 43/10 | 138/119 |
| 4,662,598 A * | 5/1987 | Weingarten | F16K 7/10 | 251/5 |
| 5,316,261 A * | 5/1994 | Stoner | G01F 1/40 | 138/45 |
| 5,326,468 A * | 7/1994 | Cox | C02F 9/00 | 210/96.1 |
| 5,582,210 A * | 12/1996 | Bartholomew | G05D 7/0106 | 138/45 |
| 6,892,900 B2 * | 5/2005 | Drechsel | F16K 7/063 | 137/487.5 |
| 8,839,993 B2 * | 9/2014 | Peirsman | B67D 1/0412 | 222/399 |
| 10,100,622 B2 * | 10/2018 | Gonzalez | E21B 43/12 | |
| 10,450,815 B2 * | 10/2019 | Gardner | E21B 21/106 | |
| 2010/0096019 A1 * | 4/2010 | DiPerna | F15D 1/02 | 137/13 |
| 2010/0193048 A1 * | 8/2010 | Chang | F16K 7/07 | 137/460 |
| 2010/0294370 A1 * | 11/2010 | Patterson | E21B 23/04 | 137/1 |
| 2016/0338619 A1 * | 11/2016 | Roxhed | A61B 5/082 | |
| 2018/0238464 A1 * | 8/2018 | Gandikota | F15D 1/025 | |
| 2019/0299909 A1 | 10/2019 | Alexander et al. | | |

* cited by examiner

LOW PROFILE PRESSURE REGULATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to low profile pressure regulators.

A pressure regulator is a control valve that regulates the pressure of fluid or gas flowing therethrough. A pressure regulator has an inlet that receives gas at an inlet pressure and an outlet that expels gas at an outlet pressure. Typically, the outlet pressure is less than the inlet pressure. Some pressure regulators maintain the outlet pressure at a constant, desired value as the inlet pressure fluctuates.

A pressure regulator typically includes a flow restrictor, a loader, and a pressure sensor. The flow restrictor is a valve, such as a globe valve, a butterfly valve, or a poppet valve, which is adjustable to different positions to restrict flow therethrough. The loader applies a load or force to the flow restrictor to adjust the position thereof and thereby adjust the outlet pressure of the pressure regulator to a desired pressure. Examples of a loader include a weight, a spring, a piston actuator, or a diaphragm actuator in combination with a spring. The pressure sensor measures the outlet pressure, a ratio of the outlet pressure to the inlet pressure, and/or a different between the inlet and outlet pressures.

Pressure regulators are typically bulky, heavy, and costly.

SUMMARY

A pressure regulator according to the present disclosure includes an inlet channel, an outlet channel, a bladder, a first plate, and a second plate. The outlet channel is configured to receive gas from the inlet channel. The bladder is configured to receive gas from the outlet channel and extends alongside of the inlet channel. The first plate is disposed on one side of the inlet channel between the bladder and the inlet channel. The second plate is disposed on the other side of the bladder and is at least partially aligned with the first plate along the length of the inlet channel such that a portion of the inlet channel is disposed between the first and second plates. When the bladder is pressurized, the bladder urges the first plate toward the second plate and thereby pinches the portion of the inlet channel disposed between the first and second plates to regulate a ratio of a pressure in the outlet channel to a pressure in the inlet channel.

In one example, the first plate includes a protrusion configured to engage the inlet channel when the bladder urges the first plate against the portion of the inlet channel disposed between the first and second plates.

In one example, the second plate defines a groove disposed opposite of the protrusion on the first plate.

In one example, the shape of the groove matches the shape of the protrusion.

In one example, the bladder includes a first portion disposed on a first side of the inlet channel and a second portion disposed on a second side of the inlet channel opposite of the first side, the first plate is disposed between the first portion of the bladder and the inlet channel, and the second plate is disposed between the second portion of the bladder and the inlet channel.

In one example, each of the first and second portions of the bladder has a first end connected to the outlet channel and a second end disconnected from the inlet and outlet channels.

In one example, the bladder is disposed on only the side of the inlet channel on which the first plate is disposed.

In one example, the width of the first and second plates is greater than the width of the inlet channel.

In one example, the ratio of a pressure in the outlet channel to the pressure in the inlet channel is approximately equal to a ratio of the width of the inlet channel to the width of the first and second plates.

In one example, the width of the bladder is greater than the width of the first and second plates.

Another pressure regulator according to the present disclosure includes an inlet channel, an outlet channel, a bladder, a first plate, and a second plate. The outlet channel is configured to receive gas from the inlet channel. The bladder is configured to receive gas from the outlet channel. The bladder includes a first portion disposed on a first side of the inlet channel and a second portion disposed on a second side of the inlet channel opposite of the first side. The first plate disposed between the first portion of the bladder and the inlet channel. The second plate is disposed between the second portion of the bladder and the inlet channel and is at least partially aligned with the first plate along the length of the inlet channel such that a portion of the inlet channel is disposed between the first and second plates. When the bladder is pressurized, the bladder urges the first and second plates toward one another and thereby pinches the portion of the inlet channel disposed between the first and second plates to regulate a ratio of a pressure in the outlet channel to a pressure in the inlet channel.

In one example, the first plate includes a protrusion configured to engage the inlet channel when the bladder urges the first plate against the portion of the inlet channel disposed between the first and second plates.

In one example, the second plate defines a groove disposed opposite of the protrusion on the first plate.

In one example, the shape of the groove matches the shape of the protrusion.

In one example, when the bladder is pressurized, the pressure within the outlet channel is less than the pressure within the inlet channel.

In one example, each of the first and second portions of the bladder has a first end connected to the outlet channel and a second end disconnected from the inlet and outlet channels.

In one example, the bladder is configured to expand when the bladder is pressurized.

In one example, the width of the first and second plates is greater than the width of the inlet channel.

In one example, the ratio of a pressure in the outlet channel to the pressure in the inlet channel is approximately equal to a ratio of the width of the inlet channel to the width of the first and second plates.

In one example, the width of the bladder is greater than the width of the first and second plates.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A pressure regulator according to the present disclosure includes an inlet channel, an outlet channel that receives gas from the inlet channel, a bladder disposed alongside the inlet channel, and a pair of plates disposed on opposite sides of the inlet channel. In one example, the bladder is disposed on both sides of the inlet channel, and each plate is disposed between the bladder and the inlet channel. In another example, the bladder is disposed on only one side of the inlet channel, and only one of the plates is disposed between the bladder and the inlet channel. In either example, one of the plates can include a protrusion that directly opposes a groove in the other plate to improve sealing of the inlet channel between the plates.

As gas flows through the pressure regulator, the gas pressurizes the bladder and thereby causes the bladder to expand. In turn, the bladder biases at least one of the plates toward the other one of the plates, which pinches the portion of the inlet channel disposed between the plates. As a result, flow from the inlet channel to the outlet channel is restricted, and therefore the pressure in the outlet channel is less than the pressure in the inlet channel. In this way, the pressure regulator regulates the ratio of the pressure in the outlet channel to the pressure in the inlet channel. The size of the bladder and/or the plates may be adjusted to control the pressure ratio achieved by the pressure regulator.

Multiple component of the pressure regulator, including the inlet and outlet channels and the bladder, may be made from soft, flexible materials. In addition, the pressure regulator has a thin, flat layered architecture (or low profile design). Thus, the pressure regulator may be smaller, lighter, and less expensive than other pressure regulators. Further, the pressure regulator may be easily integrated into a main pneumatic system.

Moreover, the pressure regulator may be integrated into inflatable units or devices such as those described in U.S. Pat. Pub. No. 2019/0299909, filed on Aug. 28, 2018 and entitled "Inflatable Control Apparatus and Deployment Method Thereof." If the pressure regulator is integrated into such an inflatable device, the pressure regulator may be stowed and deployed with the device. Since the materials and manufacturing processes associated with the pressure regulator are similar or identical to those used to build such inflatable devices, the components of the pressure regulator may be built into the inflatable devices with no additional process steps and very little additional material. Thus, the pressure regulator may be incorporated into such an inflatable device for little to no cost. Integrating the pressure regulator into such an inflatable device also eliminates the need for additional hoses, connectors, and assembly time/steps as well.

Also, multiples ones of the pressure regulator may be connected in series to combine the pressure reductions provided by the pressure regulators. For example, if three pressure regulators are connected in series and each pressure regulator provides a reduction ratio (i.e., a ratio of the output pressure to the input pressure) of 5, the resulting assembly of pressure regulators may achieve a reduction ratio of 125 (5*5*5=125). What is more, the cost, size, and weight of the assembly may still be less than a single pressure regulator having a traditional design.

Figure 1:
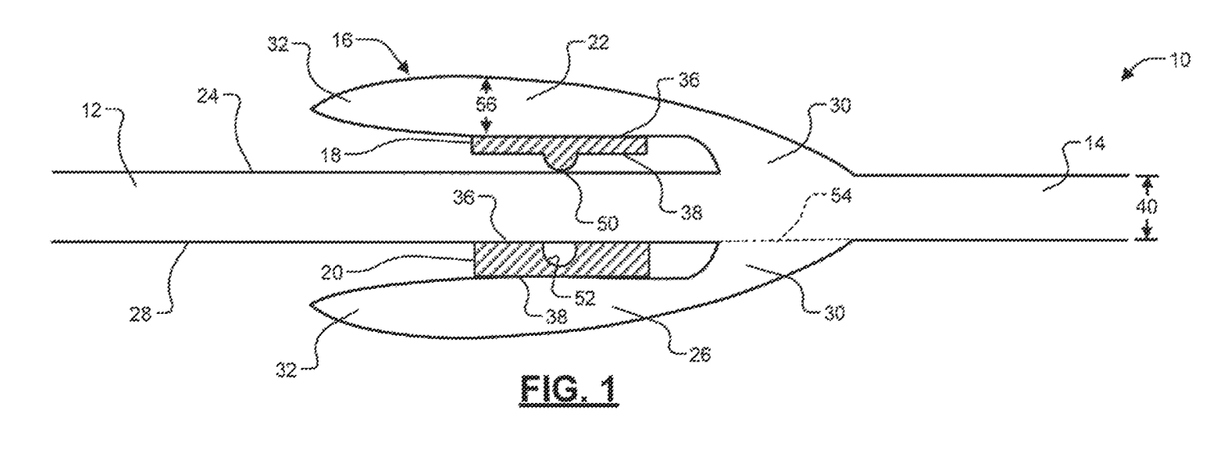
FIG. 1 is a sectioned side view of an example pressure regulator according to the present disclosure.
Figure 2:
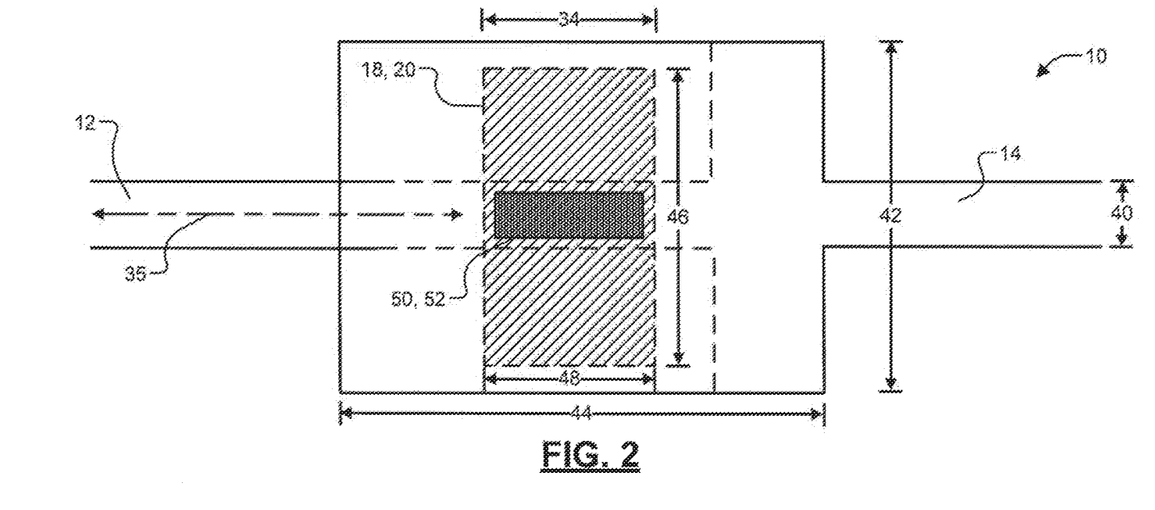
FIG. 2 is a top view of the pressure regulator of FIG. 1.

Referring now to FIGS. 1 and 2, a pressure regulator 10 includes an inlet channel 12, an outlet channel 14, a bladder 16, a top plate 18, and a bottom plate 20. Each of the inlet and outlet channels 12 and 14 may be cylindrical or tubular gas lines. Alternatively, each of the inlet and outlet channels 12 and 14 may be gas lines having other shapes such as gas lines with a rectangular or elliptical cross-section. The inlet channel 12 is configured to receive gas from a gas source (not shown). The outlet channel 14 is configured to receive gas from the inlet channel 12 and to expel gas to a gas recipient (not shown). In various implementations, the pressure regulator 10 may further include an inlet fitting (not shown) configured to connect the inlet channel 12 to the gas source and/or an outlet fitting (not shown) configured to connect the outlet channel 14 to the gas recipient.

The bladder 16 extends alongside the inlet channel 12 and is configured to receive gas from the outlet channel 14. The bladder 16 includes an upper portion 22 disposed on a top side 24 of the inlet channel 12 and a lower portion 26 disposed on a bottom side 28 of the inlet channel 12. Each of the upper and lower portions 22 and 26 of the bladder 16 has a first end 30 connected to the outlet channel 14 and a second end 32 disconnected from the inlet and outlet channels 12 and 14. As shown in FIG. 1, the second end 32 of each of upper and lower portions 22 and 26 of the bladder 16 may not be connected to anything, in which case the second end 32 may be referred to as a free end.

The inlet channel 12, the outlet channel 14, and the bladder 16 may be formed from fabric, rubber, and/or plastic. The bladder 16 may be formed from the same material as the inlet and outlet channels 12 and 14, or the bladder 16 may be formed from a different material than the inlet and outlet channels 12 and 14. The bladder 16 may be integrally formed with the inlet and outlet channels 12 and 14, or the bladder 16 may be formed separate from the inlet and outlet channels 12 and 14 and attached (e.g., sewn, fastened, adhered) to the outlet channel 14.

The walls of the inlet and outlet channels 12 and 14 may be inextensible. For example, the walls of the inlet and outlet channels 12 and 14 may not shrink or expand in response to changes in pressure within the inlet and outlet channels 12 and 14. The material type, material thickness, and geometry of the inlet and outlet channels 12 and 14 may be selected to ensure that the walls of the inlet and outlet channels 12 and 14 are inextensible.

In contrast, the walls of the bladder 16 may be elastic. For example, the walls of the bladder 16 may expand when the bladder 16 is pressurized, and the walls of the bladder 16 may shrink back to their original size when the bladder 16 is depressurized. The material type, material thickness, and geometry of the bladder 16 may be selected to ensure that the walls of the bladder 16 are elastic.

The top plate 18 is disposed on the top side 24 of the inlet channel 12 between the upper portion 22 of the bladder 16 and the inlet channel 12. The bottom plate 20 is disposed on the bottom side 28 of the inlet channel 12 between the lower portion 26 of the bladder 16 and the in the inlet channel 12. The bottom plate 20 is aligned with the top plate 18 along a portion 34 of the length of the inlet channel 12 (i.e., the dimension of the inlet channel 12 parallel to a longitudinal axis 35 thereof).

Each of the top and bottom plates 18 and 20 may have a rectangular cross-section as shown in FIG. 1. Each of the top and bottom plates 18 and 20 has a top side 36 and a bottom side 38. The top side 36 of the top plate 18 may be joined (e.g., adhered, fastened) to the upper portion 22 of the bladder 16. The bottom side 38 of the bottom plate 20 may be joined to the lower portion 26 of the bladder 16.

As shown in FIG. 2, each of the inlet and outlet channels 12 and 14 have a width 40, the bladder 16 has a width 42 and a length 44, and each of the top and bottom plates 18 and 20 has a width 46 and a length 48. The width 46 of the top and bottom plates 18 and 20 is greater than the width 40 of the inlet and outlet channels 12 and 14. The length 48 of the top and bottom plates 18 and 20 is equal to the portion 34 of the length of the inlet channel 12. The width 42 and the length 44 of the bladder 16 are respectively greater than the width 46 and the length 48 of the top and bottom plates 18 and 20.

The top plate 18 includes a protrusion 50 projecting from the bottom side 38 of the top plate 18. As shown in FIG. 1, the protrusion 50 may have a half cylinder shape with a semicircular cross-section. As shown in FIG. 2, the protrusion 50 may extend along nearly an entire portion of the length 48 of the top plate 18, and the top plate 18 may be positioned relative to the inlet channel 12 such that the protrusion 50 is aligned with the inlet channel 12.

The bottom plate 20 defines a groove 52 extending into the top side 36 of the bottom plate 20. As shown in FIG. 1, the groove 52 may have a half cylinder shape with a semicircular cross-section. The shape of the groove 52 matches, complements, or mirrors the shape of the protrusion 50 in the same way that the shape of a mold matches, complements, or mirrors the shape of a product formed by the mold. As shown in FIG. 2, the groove 52 may extend along nearly an entire portion of the length 48 of the bottom plate 20, and the bottom plate 20 may be positioned relative to the inlet channel 12 such that the groove 52 is aligned with the inlet channel 12. In addition, the bottom plate 20 may be positioned relative to the top plate 18 such that the groove 52 in the bottom plate 20 is disposed directly opposite of the protrusion 50 on the top plate 18.

In various implementations, the bladder 16 may be disposed on only one side of the inlet channel 12. For example, the bladder 16 may include only the upper portion 22 thereof, and the lower portion 26 of the bladder 16 may be omitted. Thus, FIG. 1 shows a dashed line 54 representing the wall of the outlet channel 14 if the lower portion 26 of the bladder 16 is omitted. If the bladder 16 is disposed on only one side of the inlet channel 12, an external wrap (not shown) may extend around the bladder 16 and the bottom plate 20 hold the bottom plate 20 in place below the inlet channel 12.

Figure 3:
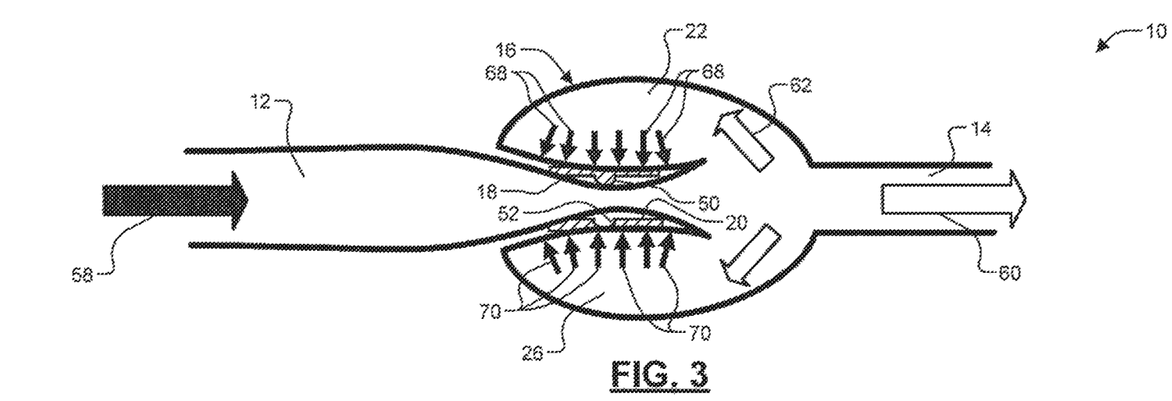
FIG. 3 is a sectioned side view of the pressure regulator of FIG. 1 when a bladder of the pressure regulator is pressurized.

Referring now to FIGS. 1 and 3, operation of the pressure regulator 10 will now be described. In FIG. 1, no gas is flowing through the pressure regulator 10, or gas flow through the pressure regulator 10 is minimal. Thus, the bladder 16 is not pressurized, and the bladder 16 is in a relaxed, original, or unexpanded state. In addition, the bladder 16 has a first maximum height 56, and the width 40 of the inlet channel 12 remains constant along the length thereof.

In FIG. 3, a sufficient amount of gas is flowing through the pressure regulator 10 to pressurize the bladder 16. When the bladder 16 is pressurized, the upper and lower portions 22 and 26 of the bladder 16 expand toward one another, which urges the top and bottom plates 18 and 20 toward one another. In turn, the top and bottom plates 18 and 20 pinch the portion of the inlet channel 12 disposed directly between the top and bottom plates 18 and 20, which restricts gas flow through the inlet channel 12. As a result, the pressure in the outlet channel 14 is less than the pressure in the inlet channel 12. In this manner, the pressure regulator 10 regulates a ratio of the pressure in the outlet channel 14 to the pressure in the inlet channel 12.

FIG. 3 shows high pressure gas flowing through the inlet channel 12 in a direction 58, and low pressure gas flowing through the outlet channel 14 in a direction 60. In addition, FIG. 3 shows the low pressure gas flowing from the outlet channel 14 to the upper portion 22 of the bladder 16 in a direction 62, and the low pressure gas flowing from the outlet channel 14 to the lower portion 26 of the bladder 16 in a direction 64. As their names indicate, the low pressure gas is at a lower pressure than the high pressure gas.

The low pressure gas within the bladder 16 pressurizes the bladder 16 and thereby causes the bladder 16 to expand. In turn, the bladder 16 has a second maximum height 66 that is greater than the first maximum height 56 of the bladder 16 when the bladder 16 is unpressurized. Due to expansion of the bladder 16, the upper portion 22 of the bladder 16 applies a downward pressure 68 to the top side 36 of the top plate 18, and the lower portion 26 of the bladder 16 applies an upward pressure 70 to the bottom side 38 of the bottom plate 20. As a result, the top and bottom plates 18 and 20 pinch the portion of the inlet channel 12 disposed therebetween, and the width of that portion of the inlet channel 12 decreases. The downward and upward pressures 68 and 70 may be equal to the pressure within the upper and lower portions 22 and 26 of the bladder 16. In addition, the downward and upward pressures 68 and 70 may be equal to one another (i.e., the pressure within the upper portion 22 of the bladder 16 may be equal to the pressure within the lower portion 26 of the bladder 16).

The protrusion 50 on the top plate 18 and the groove 52 on the bottom plate 20 improve the seal between the top and bottom plates 18 and 20 that restricts flow out of the inlet channel 12. In other words, the protrusion 50 on the top plate 18 and the groove 52 on the bottom plate 20 increase the amount by which the top and bottom plates 18 and 20 pinch the inlet channel 12 and thereby restrict flow out of the inlet channel 12. The height of the protrusion 50 and the depth of the groove 52 may be selected to yield a desired amount of flow restriction through the portion of the inlet channel 12 disposed between the top and bottom plates 18 and 20. The height of the protrusion 50 is the amount by which the protrusion 50 projects from the bottom side 38 of the top plate 18. The depth of the groove 52 is the amount by which the groove 52 extends into the top side 36 of the bottom plate 20.

Figure 4:
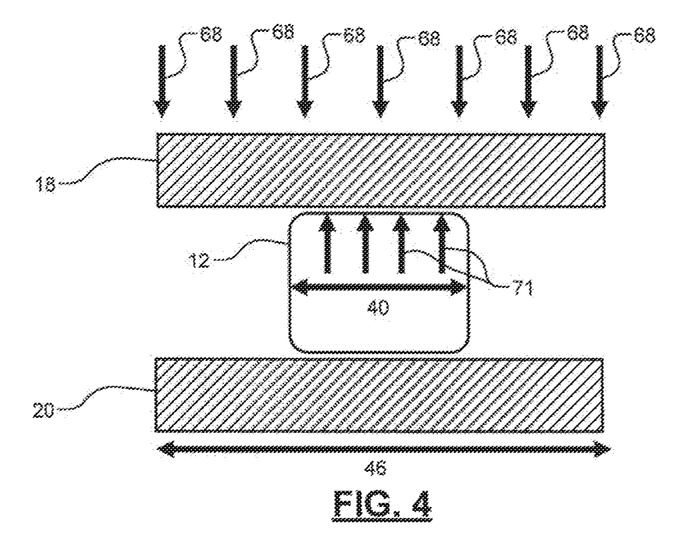
FIG. 4 is a sectioned front view of components of the pressure regulator of FIG. 1 including an inlet channel and a pair of plates disposed on opposite sides of the inlet channel.

Referring now to FIG. 4, the ratio of the pressure in the outlet channel 14 to the pressure in the inlet channel 12 is approximately equal to the ratio of the width 40 of the inlet channel 12 to the width 46 of the top and bottom plates 18 and 20. More generally, the ratio of the pressure in the outlet channel 14 to the pressure in the inlet channel 12 is approximately equal to the ratio of the cross-sectional area of the inlet channel 12 to the cross-sectional area of the top and bottom plates 18 and 20. Since the length of the top and bottom plates 18 and 20 is equal to the length of the portion of the inlet channel 12 disposed between the top and bottom plates 18 and 20, this relationship may be expressed in terms of width rather than cross-sectional area. In FIG. 4, the pressure within the inlet channel 12 is indicated at 71.

In view of the above relationship, the ratio of the pressure in the outlet channel 14 to the pressure in the inlet channel 12 may be adjusted by changing the width 46 of the top and bottom plates 18 and 20 (or selecting top and bottom plates with different widths). For example, the width 46 of the top and bottom plates 18 and 20 may be increased to decrease the outlet pressure of the pressure regulator 10. Conversely, the width 46 of the top and bottom plates 18 and 20 may be decreased to increase the outlet pressure of the pressure regulator 10.

In various implementations, the pressure regulator 10 may be provided as a kit with a plurality of top plates 18 and a plurality of bottom plates 20. Each top plate 18 and each bottom plate 20 may have a different width to yield a desired outlet pressure of the pressure regulator 10. The top plates 18 may include interchangeable mounting features (e.g., the same mounting feature) for releasably mounting each top plate 18 to the upper portion 22 of the bladder 16. Similarly, the bottom plates 20 may include interchangeable mounting for releasably mounting each bottom plate 20 to the lower portion 26 of the bladder 16. The mounting features on the top and bottom plates 18 and 20 may enable adjusting the width of the top and bottom plates 18 and 20 without modifying the bladder 16.

Figure 5:
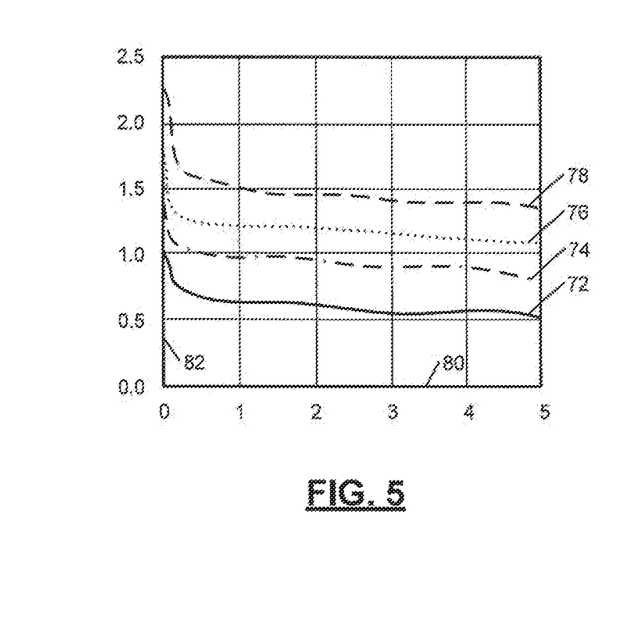
FIG. 5 is a graph including a plurality of curves illustrating performance of the pressure regulator of FIG. 1 at various inlet pressures.

Referring now to FIG. 5, a plurality of curves illustrate the performance of the pressure regulator 10 at various input pressures (i.e., pressures in the inlet channel 12). The curves reflect the performance of the pressure regulator 10 when the width 46 of the top and bottom plates 18 and 20 is 36 millimeters (mm) and the width 40 of the inlet channel 12 is 17 mm. The curves include a first curve 72, a second curve 74, a third curve 76, and a fourth curve 78. The first curve 72 corresponds to an input pressure of 2 pounds per square inch (psi), the second curve 74 corresponds to an input pressure of 3 psi, the third curve 76 corresponds to an input pressure of 4 psi, and the fourth curve 78 corresponds to an input pressure of 5 psi. The curves are plotted with respect to an x-axis 80 that represents flow rate in standard cubic feet per minute (scfm) and a y-axis 82 that represents output pressure in psi.

As shown in FIG. 5, the output pressure of the pressure regulator 10 changes as the input pressure of the pressure regulator 10 changes. However, there is not a one-to-one relationship between the changes in the input and output pressures of the pressure regulator 10. For example, when the input pressure increases from 2 psi to 3 psi, the output pressure increases from about 0.5 psi to about 1 psi. In other words, when the input pressure increases by about 1 psi, the output pressure only increases by about 0.5 psi.

Figure 6A:
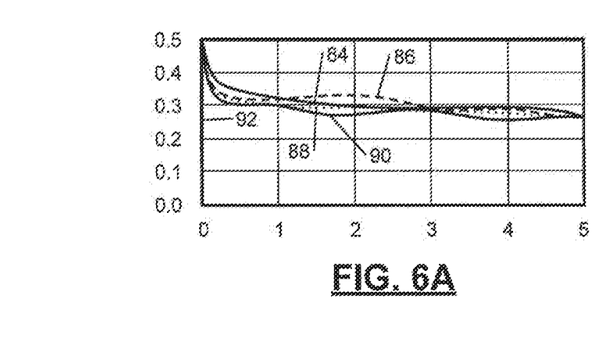
FIG. 6A is a graph including the plurality of curves of FIG. 5 normalized by pressure.

Referring now to FIG. 6A, the plurality of curves are shown that correspond to the curves of FIG. 5 after the curves of FIG. 5 are normalized by pressure (i.e., divided by the corresponding input pressure). The curves shown in FIG. 6A include a first curve 84, a second curve 86, a third curve 88, and a fourth curve 90. The first curve 84 corresponds to the first curve 72 divided by the input pressure of 2 psi. The second curve 86 corresponds to the second curve 74 divided by the input pressure of 3 psi. The third curve 88 corresponds to the third curve 76 divided by the input pressure of 4 psi. The fourth curve 90 corresponds to the fourth curve 78 divided by the input pressure of 5 psi. The first, second, third, and fourth curves 84, 86, 88, and 90 are plotted with respect to the x-axis 80 and a y-axis 92 that represents the ratio of the output pressure to the input pressure.

Figure 6B:
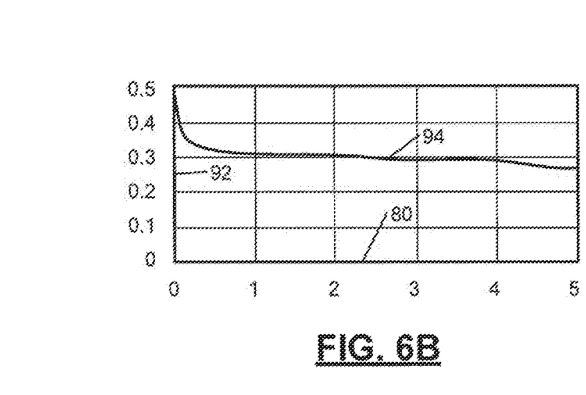
FIG. 6B is a graph including a single curve representing an average value of the plurality of curves of FIG. 6A.

As shown in FIG. 6A, the curves corresponding to the different input pressures of the pressure regulator 10 have approximately the same magnitude at various flowrates when the curves are normalized with respect to the input pressure. Thus, the pressure regulator 10 provides approximately the same ratio of output pressure to input pressure as the value of the input pressure changes. FIG. 6B shows a single curve 94 that represents the average value of the first, second, third, and fourth curves 84, 86, 88, and 90.

Figure 7:
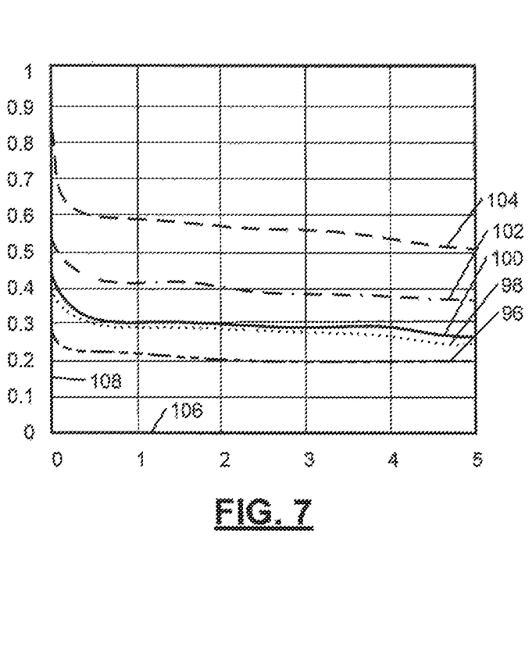
FIG. 7 is a graph illustrating the effect of plate width on the performance of the pressure regulator of FIG. 1 normalized by pressure.

Referring now to FIG. 7, a plurality of curves illustrate the performance of the pressure regulator 10 at various plate widths (i.e., various widths of the top and bottom plates 18 and 20). The curves reflect the performance of the pressure regulator 10 when the width 40 of the inlet channel 12 is 36 mm. The curves include a first curve 96, a second curve 98, a third curve 100, a fourth curve 102, and a fifth curve 104. The first curve 96 corresponds to a plate width of 48 mm, the second curve 98 corresponds to a plate width of 42 mm, the third curve 100 corresponds to a plate width of 36 mm, the fourth curve 102 corresponds to a plate width of 30 mm, and the fifth curve 104 corresponds to a plate width of 24 mm. The curves are plotted with respect to an x-axis 106 that represents flow rate in scfm and a y-axis 108 that represents the ratio of the output pressure to the input pressure.

As shown in FIG. 7, decreasing the plate width increases the ratio of the output pressure to the input pressure, and increasing the plate width decreases the ratio of the output pressure to the input pressure. In other words, for a given input pressure, decreasing the plate width increases the output pressure and thereby increases the ratio of the output pressure to the input pressure. Thus, for a given input pressure, the output pressure may be increased by decreasing the plate width, and the output pressure may be decreased by increasing the plate width.

Figure 8:
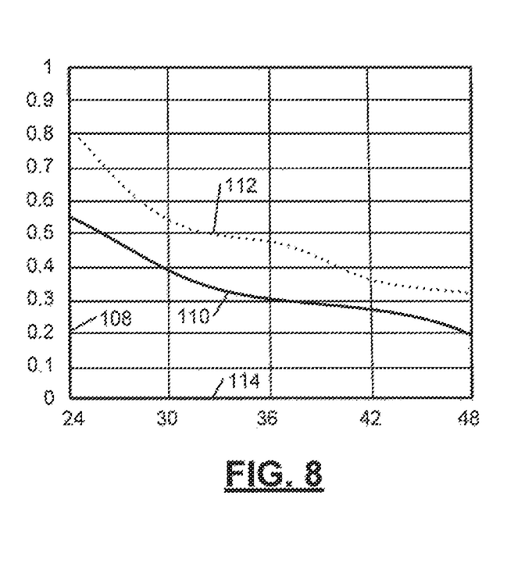
FIG. 8 is a graph illustrating the performance of the pressure regulator of FIG. 1 normalized by pressure when gas flows freely through the pressure regulator and when flow through the pressure regulator is blocked.

Referring now to FIG. 8, a pair of curves illustrate the performance of the pressure regulator 10 with an inlet channel width of 36 mm when gas flows freely through the pressure regulator 10 and when flow-through the pressure regulator 10 is blocked. The curves include a first curve 110 and a second curve 112. The first curve 110 represents the ratio of the output pressure to the input pressure for various plate widths when flow through the pressure regulator 10 is 3 scfm. The second curve 112 represents the ratio of the output pressure to the input pressure for various plate widths when flow through the pressure regulator 10 is blocked. The first and second curves 110 and 112 are plotted with respect to an x-axis 114 and the y-axis 108. The x-axis represents plate width in mm. As indicated in FIG. 8, the ratio of the output pressure to the input pressure is generally higher when flow through the pressure regulator 10 is blocked relative to when gas flows freely through the pressure regulator 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When a first element or layer is referred to as being "on," "engaged to," "connected to," or "coupled to" a second element or layer, it may be directly on, engaged, connected or coupled to the other element or layer, or intervening elements or layers may be present between the first and second elements or layers. In contrast, when a first element is referred to as being "directly on," "directly engaged to," "directly connected to," or "directly coupled to" a second element or layer, there may be no intervening elements or layers present between the first and second elements or layers. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatial and functional relationships between elements (for example, between modules, circuit elements, semiconductor layers, etc.) are described using various terms, including "connected," "engaged," "coupled," "adjacent," "next to," "on top of," "above," "below," "forward of," "rearward of," and "disposed." Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A pressure regulator comprising:
an inlet channel;
an outlet channel configured to receive gas from the inlet channel;
a bladder configured to receive gas from the outlet channel and extending alongside of the inlet channel;
a first plate disposed on one side of the inlet channel between the bladder and the inlet channel; and
a second plate disposed on the other side of the bladder and at least partially aligned with the first plate along the length of the inlet channel such that a portion of the inlet channel is disposed between the first and second plates, wherein when the bladder is pressurized, the bladder urges the first plate toward the second plate and thereby pinches the portion of the inlet channel disposed between the first and second plates to regulate a ratio of a pressure in the outlet channel to a pressure in the inlet channel, and wherein the first plate includes a protrusion configured to engage the inlet channel when the bladder urges the first plate against the portion of the inlet channel disposed between the first and second plates.

2. The pressure regulator of claim 1 wherein the second plate defines a groove disposed opposite of the protrusion on the first plate.

3. The pressure regulator of claim 2 wherein the shape of the groove matches the shape of the protrusion.

4. The pressure regulator of claim 1 wherein:
the bladder includes a first portion disposed on a first side of the inlet channel and a second portion disposed on a second side of the inlet channel opposite of the first side;
the first plate is disposed between the first portion of the bladder and the inlet channel; and
the second plate is disposed between the second portion of the bladder and the inlet channel.

5. The pressure regulator of claim 4 wherein each of the first and second portions of the bladder has a first end connected to the outlet channel and a second end disconnected from the inlet and outlet channels.

6. The pressure regulator of claim 1 wherein the bladder is disposed on only the side of the inlet channel on which the first plate is disposed.

7. A pressure regulator comprising:
an inlet channel;
an outlet channel configured to receive gas from the inlet channel;
a bladder configured to receive gas from the outlet channel and extending alongside of the inlet channel;
a first plate disposed on one side of the inlet channel between the bladder and the inlet channel; and
a second plate disposed on the other side of the bladder and at least partially aligned with the first plate along the length of the inlet channel such that a portion of the inlet channel is disposed between the first and second plates, wherein when the bladder is pressurized, the bladder urges the first plate toward the second plate and thereby pinches the portion of the inlet channel disposed between the first and second plates to regulate a ratio of a pressure in the outlet channel to a pressure in the inlet channel, and wherein the width of the first and second plates is greater than the width of the inlet channel.

8. The pressure regulator of claim 7 wherein the ratio of the pressure in the outlet channel to the pressure in the inlet channel is approximately equal to a ratio of the width of the inlet channel to the width of the first and second plates.

9. The pressure regulator of claim 7 wherein the width of the bladder is greater than the width of the first and second plates.

10. A pressure regulator comprising:
an inlet channel;
an outlet channel configured to receive gas from the inlet channel;
a bladder configured to receive gas from the outlet channel, the bladder including a first portion disposed on a first side of the inlet channel and a second portion disposed on a second side of the inlet channel opposite of the first side;
a first plate disposed between the first portion of the bladder and the inlet channel; and
a second plate disposed between the second portion of the bladder and the inlet channel and at least partially aligned with the first plate along the length of the inlet channel such that a portion of the inlet channel is disposed between the first and second plates, wherein when the bladder is pressurized, the bladder urges the first and second plates toward one another and thereby pinches the portion of the inlet channel disposed between the first and second plates to regulate a ratio of a pressure in the outlet channel to a pressure in the inlet channel.

11. The pressure regulator of claim 10 wherein the first plate includes a protrusion configured to engage the inlet channel when the bladder urges the first plate against the portion of the inlet channel disposed between the first and second plates.

12. The pressure regulator of claim 11 wherein the second plate defines a groove disposed opposite of the protrusion on the first plate.

13. The pressure regulator of claim 12 wherein the shape of the groove matches the shape of the protrusion.

14. The pressure regulator of claim 10 wherein when the bladder is pressurized, the pressure within the outlet channel is less than the pressure within the inlet channel.

15. The pressure regulator of claim 10 wherein each of the first and second portions of the bladder has a first end connected to the outlet channel and a second end disconnected from the inlet and outlet channels.

16. The pressure regulator of claim 10 wherein the bladder is configured to expand when the bladder is pressurized.

17. The pressure regulator of claim 10 wherein the width of the first and second plates is greater than the width of the inlet channel.

18. The pressure regulator of claim 17 wherein the ratio of the pressure in the outlet channel to the pressure in the inlet channel is approximately equal to a ratio of the width of the inlet channel to the width of the first and second plates.

19. The pressure regulator of claim 17 wherein the width of the bladder is greater than the width of the first and second plates.

* * * * *